UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

PRODUCT CONTAINING β-ALUMINA AND PROCESS OF PREPARING THE SAME.

1,263,708.

No Drawing.

Specification of Letters Patent. Patented Apr. 23, 1918.

Application filed March 2, 1917. Serial No. 152,099.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Products Containing β-Alumina and Processes of Preparing the Same, of which the following is a specification.

This invention relates to certain products, prepared up to the present time exclusively in the electric furnace, and adapted for abrasive, refractory and other uses, said products consisting of or containing material proportions of alumina in a crystalline modification which is designated as β-alumina (beta-alumina). This term is used to distinguish the modification from the crystal form of alumina occurring in nature (corundum, sapphire, ruby, etc.), and which is also formed when most aluminous materials, including bauxite, are melted in the electric furnace, this heretofore known crystal form of alumina being now for convenience designated α-alumina (alpha-alumina.)

β-alumina in relatively very small proportions has been recently observed associated with a greatly preponderating proportion of α-alumina in certain electric furnace products which were prepared by melting substantially pure alumina (alumina substantially free from fluxing impurities) and permitting the melt to solidify into a pig, in the manner disclosed in a prior U. S. patent granted April 12, 1910, to George N. Jeppson and Lewis E. Saunders, No. 954,808. β-alumina has also been observed in small proportions in association with a compound $MgO.Al_2O_3$, with which α-alumina has entered into solid solution (see *Journal American Chemical Society*, March 1916, page 568).

We have now observed that β-alumina, or a crystalline product containing large proportions of β-alumina, occurs at times in the form of platy crystal masses in interior portions of the pig or ingot of substantially pure alumina prepared in accordance with the patent above mentioned. Such segregated masses or bodies rich in β-alumina are distinguished from the main body of the pig by exhibiting a highly characteristic platy structure. In the commercial manufacture of abrasives from such materials it has heretofore been the unvarying practice to crush and grade the entire pig or ingot, (after cleaning off any unconverted crust) without reference to the small proportion of platy material therein, this platy material constituting at the most a few per cent. (probably not exceeding five per cent.) of the commercial abrasive grains.

β-alumina is readily distinguished under the microscope from the alpha variety, being characterized by a lower refractive index and a higher double refraction. The value for the ε-ray is approximately 1.629 to 1.65, as compared with 1.76 for α-alumina. The value for the o-ray is approximately 1.665 to 1.680, as compared with 1.768 for α-alumina. β-alumina has also a lower specific gravity, 3.30 as against 3.90 for α-alumina. Both forms are hexagonal, both uniaxial, and both have a negative optical character. The grain of β-alumina, while hard, is relatively weak. Tests of certain specimens have indicated that the hardness of β-alumina, while sufficient for commercial abrasive purposes is distinctly less than that of the alpha modification. The combination of a relatively weak structure and hardness sufficiently great to act as a good abrasive but somewhat less than that of the hardest known abrasive, indicates for β-alumina certain special applications in the abrasive field; for example, in finishing and polishing operations where individual grains if very hard and tough cause scratches.

Our researches have now shown that it is possible to prepare in the electric furnace, by fusing a suitably compounded charge, a product, as a pig or ingot, containing practically any desired proportion of β-alumina; and even to prepare such products consisting substantially or practically exclusively of β-alumina. We will proceed to describe the best means now known to us for accomplishing this result, it being understood that our invention is not limited to the use of the particular salts or compounds hereinafter specifically mentioned as "converting agents," that is to say, which are capable when added to the charge of aluminous material, of bringing about its partial or complete conversion into the beta modification.

Our invention likewise includes broadly a product of fusion of an aluminous material, which product contains material proportions of crystalline alumina of the beta variety. By "material proportions" we mean such proportions, usually in excess of ten per cent., as will affect to a material or practical extent the abrasive or other properties of the product.

The best means known to us for converting alumina, for example a charge of amorphous oxid of aluminum, $Al_2O_3$, free from notable proportions of the oxids of silicon and titanium, into crystalline alumina of the beta modification, consists in adding to the charge, and preferably intimately commingling therewith, a relatively small proportion of a salt of an alkali metal, such as sodium or potassium. Very minute additions, say under one per cent. of sodium carbonate, for example, show some effect, the beta modification being distinguishable in the product by a microscopic examination. It will be understood of course that a microscopic examination does not lend itself to an exact quantitative determination of the proportion of $\beta$-alumina present; but it is reasonable to assume that the small proportions of $\beta$-alumina heretofore observed in products obtained by the electric furnace fusion of precipitated alumina may be attributable to the presence in such alumina of small accidental traces of sodium carbonate, or of other alkali compounds, such compounds being as is well known exceedingly difficult of removal from the precipitate. However this may be, we have found that by introducing sodium carbonate in varying amounts into a charge of otherwise substantially pure alumina we are able to produce a pig or ingot containing $\beta$-alumina, the proportion of $\beta$-alumina in the product tending to rise rapidly as the proportion of added sodium carbonate is increased. The alkali metal is in part at least retained in the product (probably in the form of aluminate) and is calculated in the analysis as $Na_2O$. The following tabular statement shows certain observed relations between the amount of $Na_2O$ in the product and the proportion (approximate) of the product which exists in the beta modification.

| Per cent. $Na_2O$ in product. | Approximate % $\beta$-alumina in product. |
|---|---|
| 0.32% | 5 to 10% |
| 1.28% | 40% |
| 2.57% | 50% |
| 5.14% | 70 to 85% |

In the last-mentioned example the dense portions of the pig were found to contain about eighty per cent. of $\beta$-alumina; the porous or cellular portions about seventy per cent.; and the segregated platy portions about eighty to eighty-five per cent.

In compounding the charge somewhat more of the alkali compound is added than appears in the product, inasmuch as some loss by volatilization or otherwise is to be expected, the amount of this loss depending upon time and temperature of fusion, the proportion of alkali originally present, and perhaps other factors. For example, the above mentioned product containing 2.57% of $Na_2O$ resulted from the fusion of a charge which was compounded to contain:—

Amorphous alumina, $Al_2O_3$ ___ 96.0 per cent.
$Na_2O$ _____ 3.7 per cent.

together with about 0.3% of iron oxid and silica.

So far as observed, the formation of $\beta$-alumina is dependent upon the basic component of the converting agent (Na or $Na_2(O)$, the $CO_2$ being so far as known without effect. Therefore sodium aluminate may be regarded as equivalent to sodium carbonate, as may also other sodium salts or compounds, including caustic soda, sodium sulfate, etc. All sodium compounds are not, however, equally efficient as converting agents, that is to say, for inducing formation of the beta modification. For example, the use of sodium chlorid is attended with heavy volatilization, whereby the major portion of the sodium compound is eliminated, and relatively small proportions of $\beta$-alumina are formed in the product. Potassium salts and compounds are in general essentially similar in their action to the corresponding sodium salts. Lithium compounds effect the conversion, but apparently to a lesser degree than the corresponding sodium or potassium salts.

We believe it to be characteristic of all of these alkali additions that they yield under the operating conditions a product or a substance, the precise nature of which is as yet undetermined, which exists at least in part, at the moment of solidification of the molten mass, in the vapor phase. This is indicated in various ways, but especially it is ocularly shown by the fact that the ingot or pig, or portions thereof, have a more or less porous or cellular structure, showing either cells or channels, or both. It is probable that the substance, whatever it may be, which is present in the vapor phase, is a material of very high boiling-point, since otherwise it would be expected to disappear before or during the fusion stage. For convenience we may assume that the material is sodium aluminate or some dissociation product thereof, possibly sodium metal or sodium oxid, or the corresponding products containing potassium, etc. Whenever in this specification and claims reference is made to compounds of sodium, it is to be understood that their chemical equivalents in this art are thereby included.

The effect of sodium compounds in bringing about a transformation of the alumina to the beta modification may be wholly or in part neutralized by certain oxids having an acid character, as $SiO_2$ and $TiO_2$. In this case material proportions of $\beta$-alumina are formed only in case the soda is present in sufficient proportions to overcome the inhibiting tendency of the acid oxids.

The product containing a material proportion of, or consisting essentially of $\beta$-alumina is crushed, graded and bonded in the customary way, a ceramic or other bond, such as vulcanite, being used as may be preferred.

We claim:—

1. As a new product, a pig or mass containing a material proportion of $\beta$-alumina.
2. As a new product, a pig or mass containing in excess of fifty per cent. of $\beta$-alumina.
3. As a new product, a pig or mass consisting essentially of $\beta$-alumina.
4. As a new product, a pig or mass having as its principal components $\alpha$- and $\beta$-alumina, the latter in material proportions.
5. As a new product, a pig or mass having as its principal components $\alpha$- and $\beta$-alumina, the latter is predominating proportions.
6. As a new product, an aluminous abrasive whereof the grains contain a material proportion of $\beta$-alumina.
7. As a new product, an aluminous abrasive whereof the grains contain a predominating proportion of $\beta$-alumina.
8. As a new product, an aluminous substance containing a material proportion of $\beta$-alumina associated with a sodium compound.
9. As a new product, an aluminous substance containing a predominating proportion of $\beta$-alumina associated with a sodium compound.
10. As a new product, an aluminous substance consisting essentially of $\beta$-alumina associated with a sodium compound.
11. The process of preparing $\beta$-alumina, which consists in fusing an aluminous material with a converting agent, the latter in sufficient quantity to effect the transformation of a material proportion of the alumina in the charge into the beta modification.
12. The process of preparing $\beta$-alumina, which consists in fusing an aluminous material with a sodium compound, the latter in sufficient quantity to effect the transformation of a material proportion of the alumina in the charge into the beta modification.
13. The process of preparing $\beta$-alumina, which consists in fusing an aluminous material with sodium carbonate, the latter in sufficient quantity to effect the transformation of a material proportion of the alumina in the charge into the beta modification.
14. The process of preparing $\beta$-alumina, which consists in fusing an aluminous material with a converting agent, the latter in sufficient quantity to effect the transformation of more than half of the alumina in the charge into the beta modification.
15. The process of preparing $\beta$-alumina, which consists in fusing an aluminous material with a sodium compound, the latter in sufficient quantity to effect the transformation of more than half of the alumina in the charge into the beta modification.
16. The process of preparing $\beta$-alumina, which consists in fusing an aluminous material with sodium carbonate, the latter in sufficient quantity to effect the transformation of more than half of the alumina in the charge into the beta modification.

In testimony whereof we affix our signatures.

LEWIS E. SAUNDERS.
RAY HILL WHITE.

It is hereby certified that in Letters Patent No. 1,263,708, granted April 2 1918, upon the application of Lewis E. Saunders and Ray Hill White, of Niagara Falls, New York, for an improvement in "Products Containing β-Alumina and Processes of Preparing the Same," an error appears in the printed specification requiring correction as follows: Page 3, line 29, claim 5, for the word "is" read in; and that the said Letters Patent should be read with this correction therein that the same may conform to the record of the case in the Patent Office.

Signed and sealed this 14th day of May, A. D., 1918.

[SEAL.]

R. F. WHITEHEAD,
*Acting Commissioner of Patents.*

Cl. 204—64.